US006315664B1

(12) United States Patent
Baerlocher et al.

(10) Patent No.: US 6,315,664 B1
(45) Date of Patent: Nov. 13, 2001

(54) GAMING DEVICE HAVING AN INDICATOR SELECTION WITH PROBABILITY-BASED OUTCOME

(75) Inventors: Anthony J. Baerlocher; Cari L. Blomquist; Lance R. Peterson, all of Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/605,809

(22) Filed: Jun. 28, 2000

(51) Int. Cl.[7] .......... A63F 13/00

(52) U.S. Cl. .......... 463/21; 463/16; 463/20; 273/138.1; 273/139

(58) Field of Search .......... 463/16–21; 273/143 R, 273/138.2

(56) References Cited

U.S. PATENT DOCUMENTS

| | | | | |
|---|---|---|---|---|
| 4,624,459 | | 11/1986 | Kaufman . | |
| 4,991,848 | | 2/1991 | Greenwood et al. . | |
| 5,116,055 | | 5/1992 | Tracy . | |
| 5,456,465 | | 10/1995 | Durham . | |
| 5,542,669 | | 8/1996 | Charron et al. . | |
| 5,711,525 | | 1/1998 | Breeding . | |
| 5,833,538 | | 11/1998 | Weiss . | |
| 5,873,781 | | 2/1999 | Keane . | |
| 6,089,976 | * | 7/2000 | Schneider et al. | 463/16 |
| 6,102,798 | * | 8/2000 | Bennett | 463/16 |
| 6,155,925 | * | 12/2000 | Giobbi et al. | 463/20 |
| 6,159,097 | * | 12/2000 | Gura | 463/20 |
| 6,159,098 | * | 12/2000 | Slomiany et al. | 463/25 |

FOREIGN PATENT DOCUMENTS

| | | |
|---|---|---|
| 0874337 A1 | 10/1998 | (EP) . |
| 0945837 A2 | 9/1999 | (EP) . |
| 0984409 A2 | 3/2000 | (EP) . |

OTHER PUBLICATIONS

Copyright Atronic Casino Technology, 1995 “Volcano Island” and “Hot Cash”.*

“www.wmsgaming.com/company/press–jackpot–party.html” Website Copyright 1999 WMS Gaming Inc.*

In Between Game Description published by IGT.

Jackpot Party Brochures and Articles published by WMS Gaming, Inc. in 1998.

High Low Card Game published by Qeocities.com (printed on May 3, 2001).

Double Up Poker Game Description published by IGT.

* cited by examiner

*Primary Examiner*—Jessica J. Harrison
*Assistant Examiner*—Alex F. R. P. Rada, II
(74) *Attorney, Agent, or Firm*—Bell, Boyd & Lloyd LLC

(57) ABSTRACT

The present invention relates to a bonus scheme for a gaming device which presents a plurality of indicators to the player. Each indicator may be a success indicator or a failure indicator based on a pre-determined probability. Upon or prior to the selection of the indicator, the processor in the gaming device determines, based on that probability, if the indicator is a success indicator or a failure indicator. When a player selects an indicator, the gaming device displays if the selected indicator is a failure indicator or a success indicator and a value associated with the success indicator, The player selects indicators until the player selects all of the success indicators or the player selects a failure indicator. Accordingly, based on chance and the pre-determined probability, a bonus round may include all success indicators and no failure indicators to increase player excitement and enjoyment.

41 Claims, 5 Drawing Sheets

GAMING DEVICE HAVING AN INDICATOR SELECTION WITH PROBABILITY-BASED OUTCOME

CROSS-REFERENCE TO RELATED APPLICATIONS

This application is related to the following commonly-owned co-pending patent applications: "Gaming Device Having a Weighted Probability For Selecting A Bonus Game," Ser. No. 09/680,346; "Gaming Device With Bonus Scheme Having Multiple Award Levels," Ser. No. 09/602,140; "Gaming Device Having A Competition Bonus Scheme," Ser. No. 09/628,144; "Gaming Device Having a Bonus Round With A Win, Lose Or Draw Outcome," Ser. No. 09/722,763; and "Gaming Device Having a Multi-Round Bonus Scheme Wherein Each Round Hag a Probability of Success," Ser. No. 09/688,441.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus scheme wherein players may choose one or more indicators which either award bonus values or terminate the bonus round based on a mathematical calculation using a predetermined probability.

BACKGROUND OF THE INVENTION

Gaming machines currently exist with bonus schemes in which the player has one or more opportunities to choose a particular selection or indicator from a group of indicators. An indicator may be any symbol or image such as a number, letter or graphical representation of a person, place or thing. When a player chooses an indicator, the game will either award the player with a bonus value or terminate the bonus round. The outcome depends upon the particular indicator selected by the player.

When the player selects an indicator which awards a bonus value (hereinafter referred to as "success indicator"), the player receives one or more bonus values, and the player has another chance to select another indicator. Each time the player selects a success indicator, the game typically displays a message for the player such as "NEXT." This message means that the bonus round continues and the player may choose another indicator. The player then selects another indicator, and this process continues until the player selects an indicator which terminates the bonus round (hereinafter referred to as "failure indicator").

When the player selects a failure indicator, typically the game displays a message for the player such as "COLLECT." This message means that the bonus round has terminated, and the player collects any bonus values the player accumulated.

Gaming machines with this type of bonus scheme are programmed so that in each bonus round certain indicators or a certain number of indicators are success indicators and certain indicators or a certain number of indicators are failure indicators. Consequently, the percentage of success indicators is predetermined and fixed. Therefore, when playing a bonus round, it is impossible for the player to select success indicators beyond the fixed percentage. Chance is only involved in the timing as to when the player chooses a failure indicator—before or after achieving the fixed percentage of success indicators. With this limited level of chance involved in the bonus round, players enjoy a minimal level of excitement and enjoyment. European Patent Application No. EP 0 945 837 A2 filed on Mar. 18, 1999 and assigned on its face to WMS Gaming, Inc. discloses a bonus scheme generally of this type.

SUMMARY OF THE INVENTION

The present invention overcomes the above shortcomings by providing a gaming device which has a bonus scheme wherein each of the indicators has a certain probability of being a success indicator or a failure indicator. Similar to flipping a coin where the predetermined probability of being heads or tails is fifty percent, in the present invention there is a predetermined probability of each indicator being a success indicator or a failure indicator. Upon or prior to the selection of the indicator, the computer in the gaming device determines, based on that probability, if the indicator is a success indicator or a failure indicator. Preferably all of the indicators have the same probability although the indicators may have different probabilities. Game manufacturers, casinos and others who commercialize the gaming device of the present invention may program the bonus round with desired probabilities for success indicators and failure indicators, depending on the payout desired and the level of excitement desired. Accordingly, in any bonus round, all of the indicators may be success indicators.

The gaming device of the present invention includes a game preferably a slot machine, involving various combinations of indicia. The indicia are in the form of symbols often appearing on mechanical reels or simulated rotating reels (i.e., video reels). A player pushes a button or other activator and thereby randomly generates different indicia combinations. The game is programmed so that certain combinations will automatically initiate a bonus round.

When a player achieves such a combination, the bonus round begins. The bonus round gives a player the opportunity to gain credits beyond the credits the player has gained in the primary game. The bonus round also gives a player additional excitement and a reward for having played the game for a relatively long period of time.

The bonus round begins by providing the player with at least one and preferably a plurality of indicators. The game determines, based on the predetermined probability for each indicator whether each indicator is a success or a failure indicator. The player chooses an indicator. The computer processor of the gaming device, displays a success indicator or a failure indicator. If the processor displays a failure indicator, the bonus round terminates. If the processor displays a success indicator, the game awards the player with the bonus value displayed with or corresponding to the success indicator. The bonus value numerals may themselves be the success indicator. The amount of the bonus value for each success indicator may vary. After the player achieves a success indicator, the player receives the appropriate bonus values, and the game gives the player another chance to choose another indicator.

This process continues until the gaming device displays a failure indicator or until the player has chosen all of the indicators in the bonus round. In either case the bonus round terminates. Alternatively, if the player chooses all of the indicators and they are all success indicators, the game may award the player with an achievement bonus value, the bonus round may automatically repeat or the game may provide a different bonus round. Upon termination of the bonus round, the game accumulates all of the bonus credits which the player has won and awards them to the player.

According to one embodiment of the present invention, the bonus scheme is placed in the context of a dodgeball game. The indicators are represented by a plurality of target characters. A separate character throws balls at the target characters or indicators. The player decides which target character will try to catch the ball. Each target character can catch the ball or be hit by the ball.

If the player chooses a target character who catches the ball (i.e., a failure indicator), the bonus round ends. If the player chooses a target character who is hit by the ball (i.e., a success indicator), the game awards the player with bonus values. The bonus round terminates when a target character catches a ball or after the ball hits all of the target characters in the bonus round.

It is therefore an object of the present invention to provide a gaming device having a bonus scheme with indicators having a predetermined probability-based outcome.

Another object of the present invention to provide a gaming device having a bonus scheme wherein the percentage of success indicators is not predetermined and fixed.

Yet another object of the present invention is to provide a gaming device having a bonus scheme which provides players with an increased level of excitement arising from chance.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
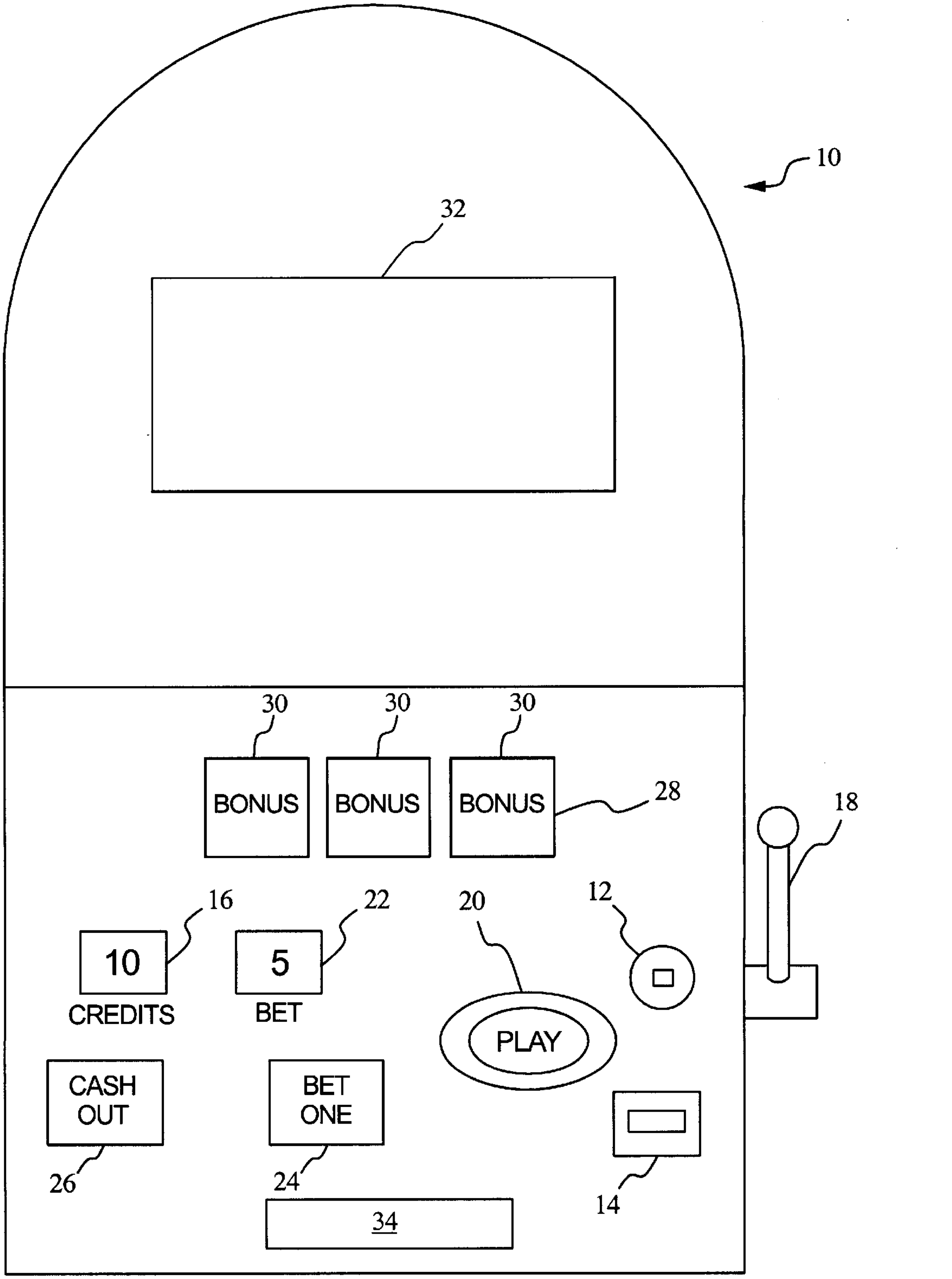
FIG. 1 is a front plan view one embodiment of the gaming device present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing. However, it should be appreciated that gaming device 10 can be constructed as a pub-style table-top game (not shown) which a player can operate while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28.

At any time during the game, a player may "cash out" and thereby receive a number of coins corresponding to the number of remaining credits by pushing a cash out button 26. When the player "cashes out," the player receives the coins in a coin payout tray 34. The gaming device 10 may employ other payout mechanisms such as credit slips redeemable by a cashier or electronically recordable cards which keep track of the player's credits.

Figure 2:
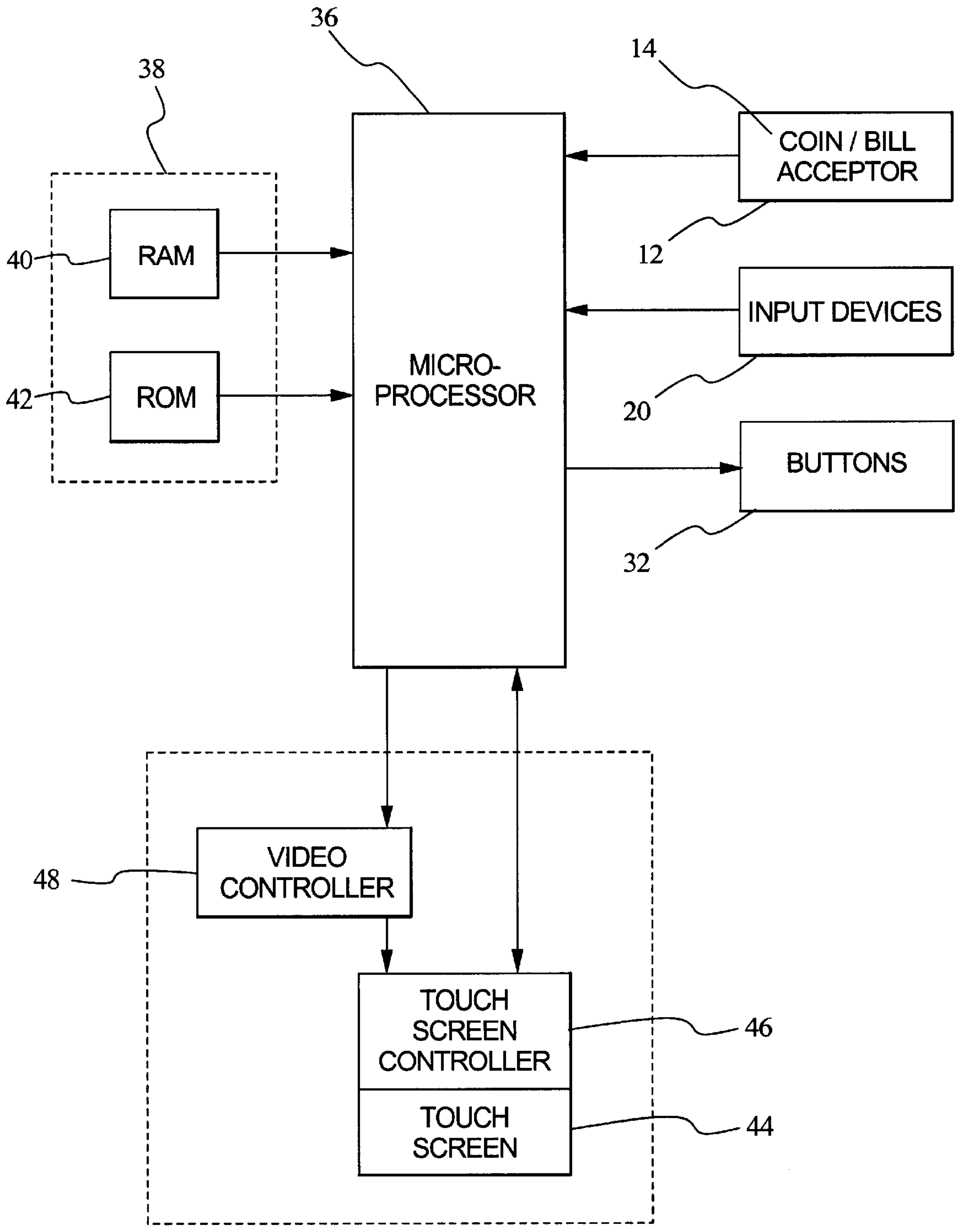
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device such as play buttons 20. The processor 36 is preferably a microprocessor or microcontroller-based platform which is capable of displaying images, symbols and other indicia such as images of people characters, places, things and faces of cards. The memory device 38 can include random access memory (RAM) 40 for storing event data or other data generated or used during a particular game. The memory device 38 can also include read only memory (ROM) 42 for storing program code which controls the gaming device 10 so that it plays a particular game in accordance with applicable game rules and pay tables.

As illustrated in FIG. 2, in terms of input preferably the player uses play buttons 20 to input signals into gaming device 10. Furthermore, it is preferable that touch screen 44 and an associated touch screen controller 46 are used instead of a conventional video monitor 32. Touch screen 44 and touch screen controller 46 are connected to a video controller 48 and processor 36. A player can make decisions and input signals into the gaming device 10 by touching touch screen 44 at the appropriate places. As further illustrated in FIG. 2, the processor 36 can be connected to coin slot 12 or bill acceptor 14. The processor 36 can be programmed to require a player to deposit a certain amount of money in order to start the game.

It should be appreciated that although a processor 36 and memory device 38 are preferable implementations of the present invention, the present invention can also be implemented using one or more application-specific integrated circuits (ASIC's) or other hard-wired devices, or using mechanical devices. Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection microwave link, and the like.

With reference to FIGS. 1 and 2, to operate the gaming device 10, the player must insert the appropriate amount of money at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device also includes a display device such as a video monitor 32 shown in FIG. 1 enabling the player to play the bonus round. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Bonus Scheme

If a player achieves a bonus triggering or qualifying condition while playing the game, the gaming device 10 automatically begins the bonus round of the present invention. As indicated by block 50 in FIG. 3, the bonus round of the present invention begins by providing a player with a plurality of indicators on a display device 32 (FIG. 1). The indicators can display varying graphics and be of varying sizes, shapes and colors. The indicators are shown in FIG. 4 as squares in a grid, however, it should be appreciated that indicators can be separated and spread apart in an orderly or disorderly fashion.

Figure 3:
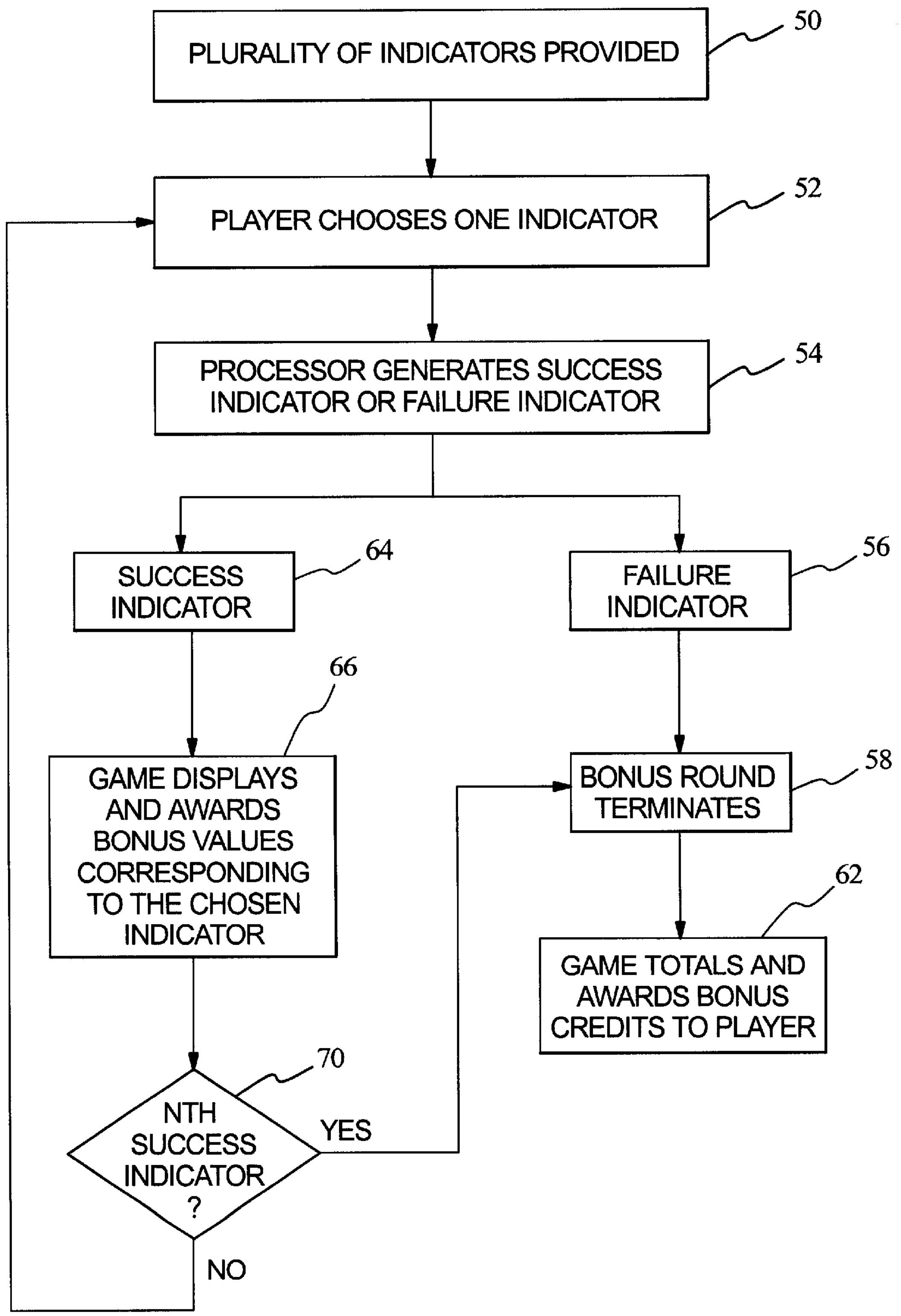
FIG. 3 is a flow diagram of one embodiment of the bonus scheme of the present invention.
Figure 4:
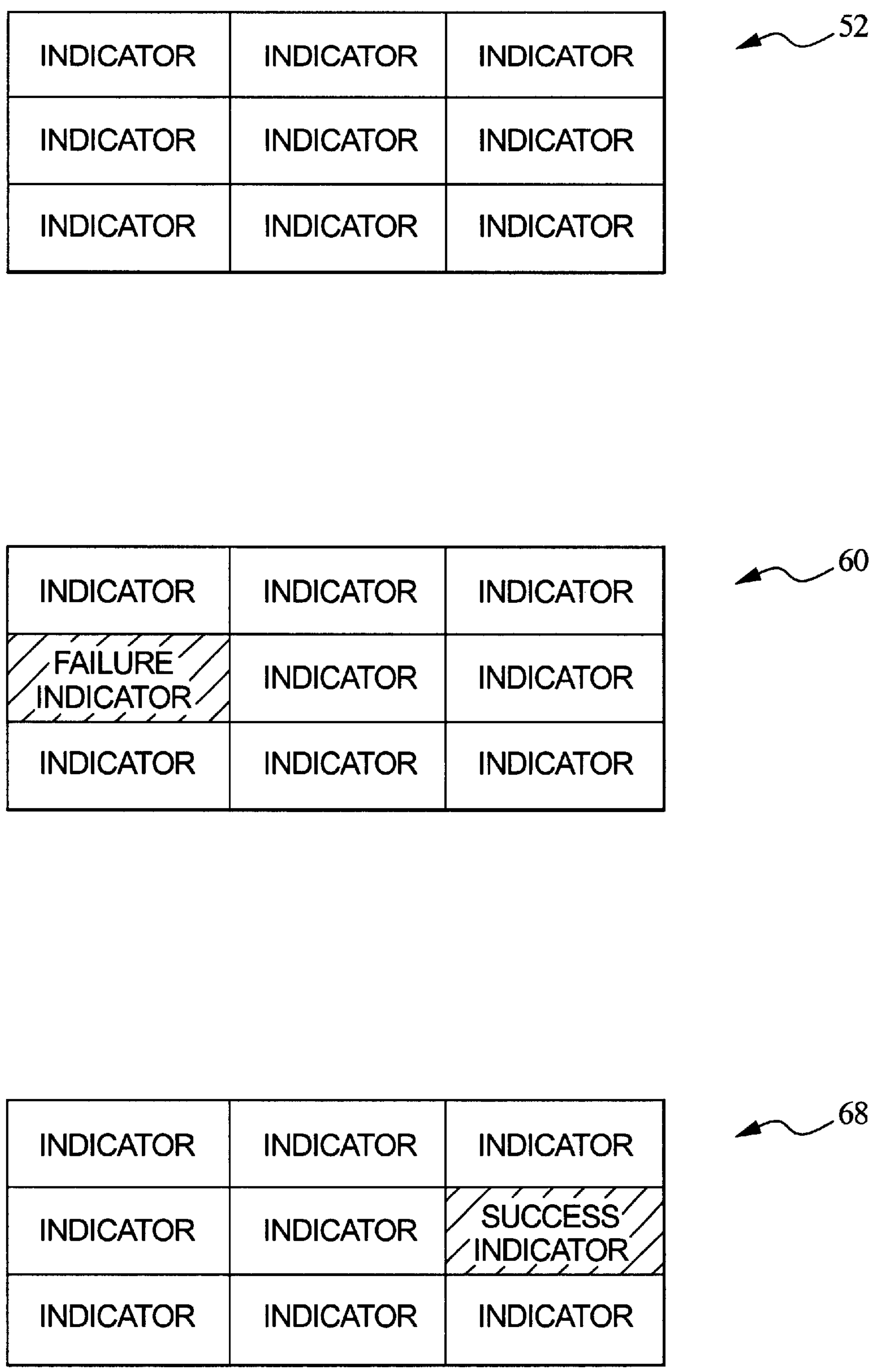
FIG. 4 is a top plan view of the indicators in one embodiment of the bonus scheme of the present invention.

After reviewing the plurality of indicators, the player chooses one indicator by touching the screen 32 displaying the indicator as indicated by block 52 in FIG. 3. Each time a player chooses an indicator, the processor 36 will generate either a success indicator or a failure indicator. When the player chooses an indicator, or preferably prior to displaying all the indicators to the player, the processor carries out one or more mathematical calculations based on predetermined probabilities for each indicator and determines if the indicator will be a success indicator or a failure indicator as indicated by block 54. Preferably, for all of the indicators for a particular bonus scheme, the processor 36 uses the same probability of being a success indicator. In one preferred embodiment, eighty-seven percent of the time, the processor 36 will generate a success indicator, and thirteen percent of the time, the processor 36 will generate a failure indicator. Other embodiments of the present invention can use different probabilities which may or may not vary for each indicator.

As shown in FIG. 3, if processor 36 generates or displays a failure indicator as indicated by block 56, the bonus round terminates as indicated by block 58. A failure indicator is generally illustrated in grid 60 in FIG. 4 (i.e., the player selected the indicator in the first column and second row which resulted in a failure indicator.)

Upon termination, the game accumulates any bonus values and awards them to the player as indicated by block 62. If processor 36 generates or displays a success indicator, the game awards the player with bonus values corresponding to the chosen indicator, as indicated by blocks 64 and 66. Preferably, the game displays this bonus value on the video monitor 22. A success indicator is illustrated in grid 68 in FIG. 4 (i.e., the player selected the indicator in the third column and second row which resulted in a success indicator.) The success indicator may be a value of number of credits or symbol which represents a number of credits.

The processor 36 also determines how many success indicators the player has achieved, as indicated by diamond 70. In this embodiment, the maximum amount of success indicators any player can achieve is equal to the total number of indicators in any particular bonus round. For instance, if a bonus round has ten indicators, a player could achieve no more than ten success indicators.

If the amount of success indicators a player achieves is less than the total amount of indicators provided in the bonus round, the player may select another indicator. This process continues until the processor 36 generates or displays a failure indicator or until the player has achieved the maximum amount of success indicators. In either case, preferably the bonus round terminates as indicated by block 58, and the gaming device 10 awards credits to the player as indicated by block 62. It should be appreciated that the bonus scheme of the present invention could be designed so that if a player achieves the maximum amount of success indicators, the game awards the player with an achievement bonus value and/or the bonus round is automatically renewed. The achievement bonus value can be any amount and determined in any manner. Preferably, the achievement bonus value is a predetermined value.

Furthermore, if processor 36 generates success indicators and failure indicators before the player chooses an indicators, the bonus scheme can include a reveal screen. The bonus scheme of the present invention can be designed so that when a choice results in a failure indicator, video monitor 32 shown in FIG. 1 graphically reveals the location of the success indicators and failure indicators. This reveal screen can increase the excitement experienced by a player because the player will know which indicators would have been successful.

Since the bonus scheme of the present invention utilizes a probability-based mathematical calculation, a player may reach a failure indicator early in the bonus round (i.e., within the player's first few choices). At some point after playing several bonus rounds, players can become frustrated if, within their first few choices, they repeatedly reach a failure indicator. It should be appreciated that certain techniques can be used to minimize this type of frustration.

One technique requires processor 36 to perform its probability-based calculation before the player chooses an indicator. Processor 36 can discard its mathematical results and generate new results whenever a relatively high or predetermined percentage of failure indicators have been generated. This technique and others may be used to increase the likelihood that a player will achieve at least a minimal level of success and increase player excitement and enjoyment.

This bonus scheme of the present invention provides players with an element of chance not offered in existing bonus schemes. The game provides players with an opportunity to choose from a group of indicators. The outcome could be a success indicator or a failure indicator. The outcome is not fixed, limiting a player's chance of success. Instead, the outcome varies, depending upon a mathematical probability calculation. A player could thus choose all of the indicators, all resulting in success indicators. At the same time, upon a player's first choice, the outcome could be a failure indicator, ending the bonus round. An additional bonus value could be awarded if the player obtains all success indicators in the bonus round. Alternatively, in such case, the bonus round may be repeated.

Figure 5:
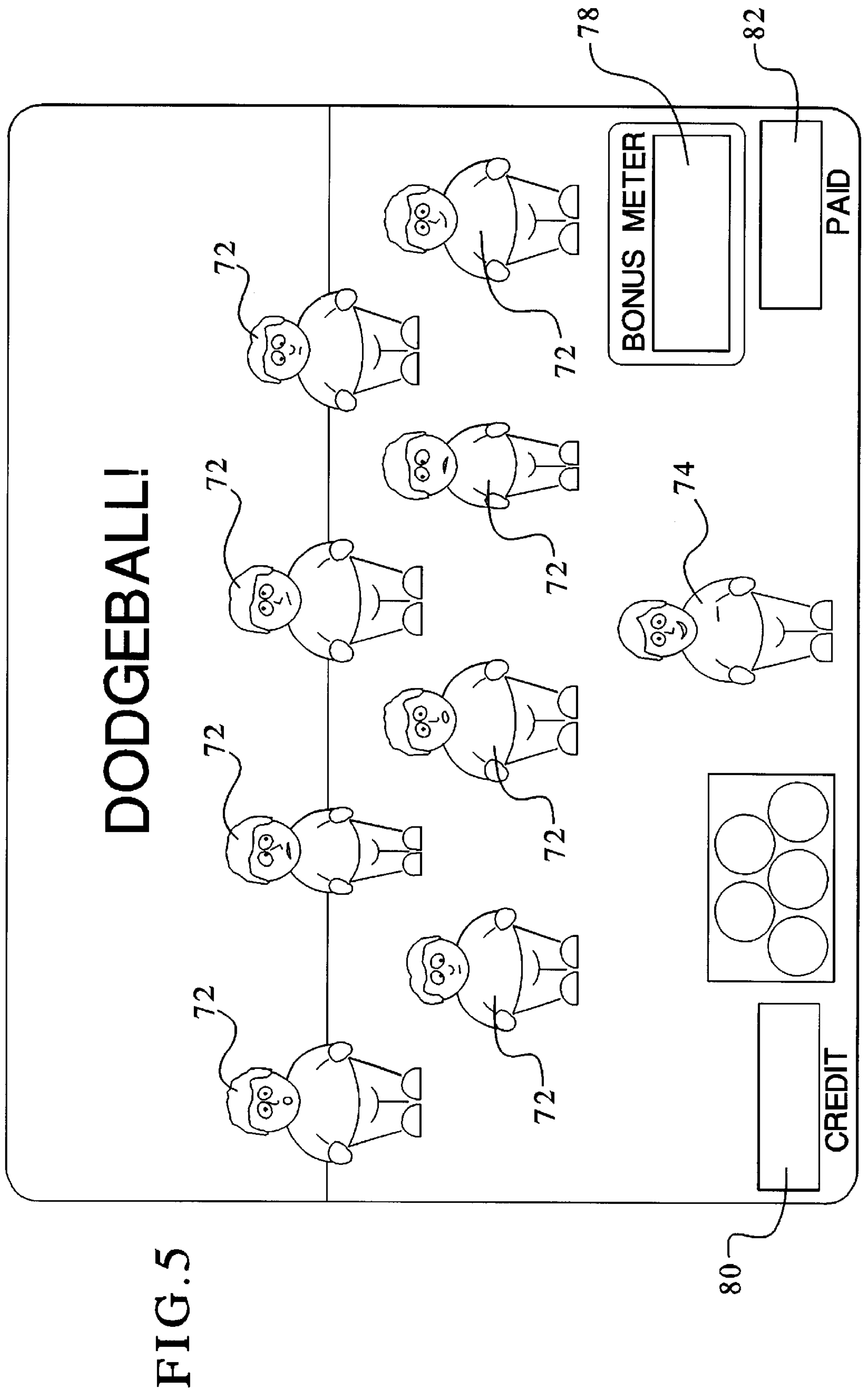
FIG. 5 is a top plan view of an alternative embodiment of the indicators of the bonus scheme of the present invention.

In one preferred embodiment of the present invention shown in FIG. 5, the bonus scheme is implemented through target characters 72 participating in a dodgeball game. The target characters 72 are the indicators. Another character 74 throws a ball at a target character 72 selected by the player. The player chooses a target character 72 by touching touch screen 44 at the location of the image of the target character 72. After the player touches touch screen 44, the character 74 automatically retrieves a ball and throws it at the selected target character 72.

Prior to displaying the target characters 72 or when a player chooses a target character 72, the processor 36 performs mathematical calculations based on the predetermined probability for each indicator. The processor 36 generates or displays a success indicator or failure indicator for the chosen target character 72. If the processor 36 generates or displays a success indicator, the ball hits the target character 72 and bounces off the target character 72. The target character 72 is knocked over or off balance, and a bonus credit appears near the target character 72. In addition bonus meter 78, which displays a running total of all bonus values will display the bonus values which the player gained.

If the processor 36 generates or displays a failure indicator, the target character 72 catches the ball and the bonus round terminates. In addition, if the player achieves 2 number of success indicators equal to the total number of target characters 70, the bonus round automatically terminates. In either case, once the bonus round terminates, the game accumulates and awards any bonus credits which the player gained. The game displays the credit points which the player gained at credit meter 80. The game displays the amount of money the player has won in the paid window 82 illustrated in FIG. 5.

As shown in FIG. 5, the scenery for this preferred embodiment is a gymnasium setting including one or more phrases such as "Let's Play Dodgeball!" In addition, the preferred embodiment can include audio features (i.e., songs, voices, and other sound effects) which are consistent with the dodgeball theme of this preferred embodiment.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a bonus game comprising:

a plurality of selectable indicators;

an independent award probability associated with each of said selectable indicators;

a display device which displays the selectable indicators; and a processor for communicating with said display device, independently determining if an award is associated with each selected indicator after said selected indicator is selected and based on the independent award probability associated with said selected indicator, and providing a player any award associated which each selected indicator.

2. The gaming device of claim 1, wherein the bonus game ends if the processor determines that an award is not associated with a selected indicator based on the independent award probability associated with said selected indicator.

3. The gaming device of claim 1, wherein the independent award probability associated with each of said selectable indicators is the same.

4. The gaming device of claim 3, wherein the independent award probabilities associated with the selectable indicators are at least fifty percent.

5. The gaming device of claim 3, wherein the independent award probabilities associated with the selectable indicators are at least seventy-five percent.

6. The gaming device of claim 1, which includes a plurality of different independent award probabilities associated with different selectable indicators.

7. The gaming device of claim 1, wherein the selectable indicators are player selectable.

8. The gaming device of claim 7, wherein the display device includes a touch screen which enables the player to select the selectable indicators.

9. The gaming device of claim 1, wherein the independent award probabilities are randomly determined.

10. The gaming device of claim 1, which includes different awards associated with different selectable indicators.

11. A gaming device having a bonus game comprising:

a plurality of selectable indicators;

a n independent award probability associated with each of said selectable indicators;

a display device which displays the selectable indicators; and a processor for communicating with said display device, independently determining if an award is associated with a plurality of the selectable indicators before the selectable indicators are selected and based on the independent award probabilities associated with said selectable indicators, and providing a player any award associated which each selectable indicator after said selectable indicator is selected.

12. The gaming device of claim 11, wherein the bonus game ends if the processor has determined that an award is not associated with a selected indicator based on the independent award probability associated with said selected indicator.

13. The gaming device of claim 11, wherein the independent award probability associated with each selectable indicator is the same.

14. The gaming device of claim 13, wherein the independent award probabilities associated with the selectable indicators are at least fifty percent.

15. The gaming device of claim 13, wherein the independent award probabilities associated with the selectable indicators are at least seventy-five percent.

16. The gaming device of claim 11, which includes a plurality of different independent award probabilities associated with said selectable indicators.

17. The gaming device of claim 11, wherein the selectable indicators are player selectable.

18. The gaming device of claim 17, wherein the display device includes a touch screen which enables the player to select the selectable indicators.

19. The gaming device of claim 11, wherein the independent award probabilities are randomly determined.

20. The gaming device of claim 11, which includes a plurality of different awards associated with said selectable indicators.

21. A gaming device having a game comprising:

a plurality of player selectable indicators, each of said selectable indicators being a success indicator or a failure indicator;

an independent probability of success associated with each of said selectable indicators;

a display device for displaying said selectable indicators;

a selector for enabling a player to select said selectable indicators;

a plurality of awards; and a processor for communicating with said display device and said selector, independently determining if each selected indicator is a success indicator or a failure indicator after a player selects said selected indicator and based on the independent probability of success associated with said selected indicator, and providing one of said awards to said player for each selected indicator which is a success indicator.

22. The gaming device of claim 21, wherein the bonus game ends if, after said player selects one of the selectable indicators, the processor determines that said selected indicator is a failure indicator based on the independent probability of success associated with said selected indicator.

23. The gaming device of claim 21, which includes an additional award provided to the player if a plurality of the selected indicators are success indicators.

24. The gaming device of claim 21, which includes an additional award provided to the player if all of the selected indicators are success indicators.

25. A gaming device having a game comprising:

a plurality of player selectable indicators, each said selectable indicator being a success indicator or a failure indicator;

an independent probability of success associated with each of said selectable indicators;

a display device for displaying said selectable indicators;

a selector for enabling a player to select said selectable indicators;

a plurality of awards; and a processor for communicating with said display device and said selector, independently determining if each selectable indicator is a success indicator or a failure indicator before a player selects said selectable indicators and based on the independent probabilities of success associated with said selectable indicators and providing one of said awards to said player for each selected indicator which is selected by the player and is a success indicator.

26. The gaming device of claim 25, wherein the bonus game ends if a selected indicator is a failure indicator based on the independent probability of success associated with said selected indicator as determined by the processor.

27. The gaming device of claim 25, which includes an additional award provided to the player if a plurality of the selected indicators are success indicators.

28. The gaming device of claim 25, which includes an additional award provided to the player if all of the selected indicators are success indicators.

29. A method for providing a bonus opportunity in a gaming device, said method comprising the steps of:

(a) triggering a bonus game;

(b) displaying a plurality of player selectable indicators;

(c) enabling a player to select one of said selectable indicators;

(d) independently determining if an award is associated with the selected indicator based on an independent award probability associated with said selected indicator;

(e) displaying the award, if any, associated with said selected indicator;

(f) repeating steps (c) to (e) until an award is not associated with one of the selected indicators or until the player has selected all of the selectable indicators; and (g) ending the bonus game.

30. The method of claim 29, which includes determining a number of awards associated with the selected indicators prior to ending the bonus game and repeating steps (b) to (f) until a predetermined number of the awards are associated with the selected indicators.

31. The method of claim 29, which includes determining a value of the awards associated with the selected indicators prior to ending the bonus game and repeating steps (b) to (f) if the value of said awards is less than a predetermined value.

32. The method of claim 29, which includes awarding the player an achievement bonus if awards are associated with all of the selected indicators.

33. The method of claim 29, which includes repeating steps (b) to (f) before ending the bonus game if awards are associated with all of the selected indicators.

34. A method for providing a game in a gaming device, said method comprising the steps of:

(a) displaying a plurality of selectable indicators to a player, each said selectable indicator having a pre-determined probability of being a success indicator or a failure indicator;

(b) enabling the player to select one of said selectable indicators;

(c) independently determining if said selected indicator is a success indicator or failure indicator based on the pre-determined probability associated with said selected indicator after the player selects said selected indicator;

(d) displaying if the selected indicator is a success indicator or failure indicator;

(e) repeating steps (b) to (d) until the player selects all of the selectable indicators or the player selects a selectable indicator which is a failure indicator; and (f) providing the player with any award associated with the selected indicators which are success indicators.

35. A method for providing a game in a gaming device, said method comprising the steps of:

(a) displaying a plurality of selectable indicators to a player, each said selectable indicator having a pre-determined probability of being a success indicator or a failure indicator;

(b) enabling the player to select one of said selectable indicators;

(c) independently determining if said selected indicator is a success indicator or failure indicator based on the pre-determined probability associated with said selected indicator after the player selects said selected indicator;

(d) displaying if the selected indicator is a success indicator or failure indicator;

(e) repeating steps (b) to (d) until the player selects all of the selectable indicators or the player selects an indicator which is a failure indicator; and (f) providing the player with an award if the player selects a predetermined number of indicators which are success indicators.

36. A method for providing a game in a gaming device, said method comprising the steps of:

(a) displaying a plurality of selectable indicators to a player, each said selectable indicator having a pre-determined probability of being a success indicator or a failure indicator;

(b) independently determining if each said selectable indicator is a success indicator or failure indicator based on the pre-determined probability associated with said selectable indicators before the player selects said selectable indicators;

(c) enabling the player to select one of said selectable indicators;

(d) displaying if the selected indicator is a success indicator or failure indicator;

(e) repeating steps (c) to (d) until the player selects all of the selectable indicators or the player selects one of the selectable indicators which is a failure indicator; and (f) providing the player with any awards associated with the selected indicators which are success indicators.

37. A method for providing a game in a gaming device, said method comprising the steps of:

(a) displaying a plurality of selectable indicators to a player, each said selectable indicator having a pre-determined probability of being a success indicator or a failure indicator;

(b) independently determining if each said selectable indicator is a success indicator or failure indicator based on the pre-determined probability associated with said selectable indicators before the player selects said selectable indicators;

(c) enabling the player to select one of said selectable indicators;

(d) displaying if the selected indicator is a success indicator or failure indicator;

(e) repeating steps (c) to (d) until the player selects all of the selectable indicators or the player selects a selectable indicator which is a failure indicator; and (f) providing the player with an award if the player selects a predetermined number of selectable indicators which are success indicators.

38. A gaming device having a bonus game comprising:

a plurality of selectable indicators;

a plurality of independent award probabilities, wherein each of the independent award probabilities is associated with one of the selectable indicators and a sum of the independent award probabilities is not equal to one hundred percent;

a display device which displays the selectable indicators; and a processor which: (a) communicates with the display device; (b) independently determines, on a bonus game-by-bonus game basis, if an award is associated with each selected indicator during play of the bonus game based on the independent award probability associated with the selected indicator; and (c) provides a player with any award associated with each selected indicator.

39. A gaming device comprising:

at least one memory device;

a display device;

a processor connected to the memory device and the display device;

a plurality of instructions stored in the memory device, said instructions for ceasing the processor and display device to:

(a) initiate a bonus game;

(b) display a plurality of player selectable indicators;

(c) enable a player to select one of said selectable indicators;

(d) independently determine if an award is associated with the selected indicator based on an independent award probability associated with said selected indicator;

(e) display the award, if any, associated with said selected indicator;

(f) repeat steps (c) to (e) until an award is not associated with one of the selected indicators or until the player has selected all of the selectable indicators; and (g) end the bonus game.

40. The gaming device of claim 39, wherein the instructions cause the processor to determine any awards which are associated with the selectable indicators prior to enabling the player to select said selectable indicators.

41. The gaming device of claim 39, wherein the instructions cause the processor to determine any award which is associated with a selected indicator following the player's selection of said selected indicator.

* * * * *

UNITED STATES PATENT AND TRADEMARK OFFICE

CERTIFICATE OF CORRECTION

PATENT NO. : 6,315,664 B1 
DATED : November 13, 2001
INVENTOR(S) : Anthony J. Baerlocher et al.

It is certified that error appears in the above-identified patent and that said Letters Patent is hereby corrected as shown below:

Title page, Item [54], and Column 1, line 3,
Change "OUTCOME" to -- OUTCOME BONUS SCHEME --.

Column 1,
Line 16, change "round hag" to -- round has --.

Column 2,
Line 36, change "game preferably" to -- game, preferably --.

Column 3,
Line 41, change "view one" to -- view of one --.
Line 42, "device present" to -- device of the present --.

Column 7,
Line 51, change "achieves 2" to -- achieves a --.

Column 8,
Line 24, change "associated which" to -- associated with --.
Line 54, change "a n independent" to -- an independent --.
Line 64, change "associated which" to -- associated with --.

Column 9,
Line 44, change "the bonus" to -- the --.

Column 10,
Line 8, change "the bonus" to -- the --.

UNITED STATES PATENT AND TRADEMARK OFFICE

CERTIFICATE OF CORRECTION

PATENT NO. : 6,315,664 B1
DATED : November 13, 2001
INVENTOR(S) : Anthony J. Baerlocher et al.

It is certified that error appears in the above-identified patent and that said Letters Patent is hereby corrected as shown below:

<u>Column 12,</u>
Line 34, change "for ceasing" to -- for causing --.

Signed and Sealed this

Thirteenth Day of August, 2002

*Attest:*

JAMES E. ROGAN

*Attesting Officer*

*Director of the United States Patent and Trademark Office*